UNITED STATES PATENT OFFICE.

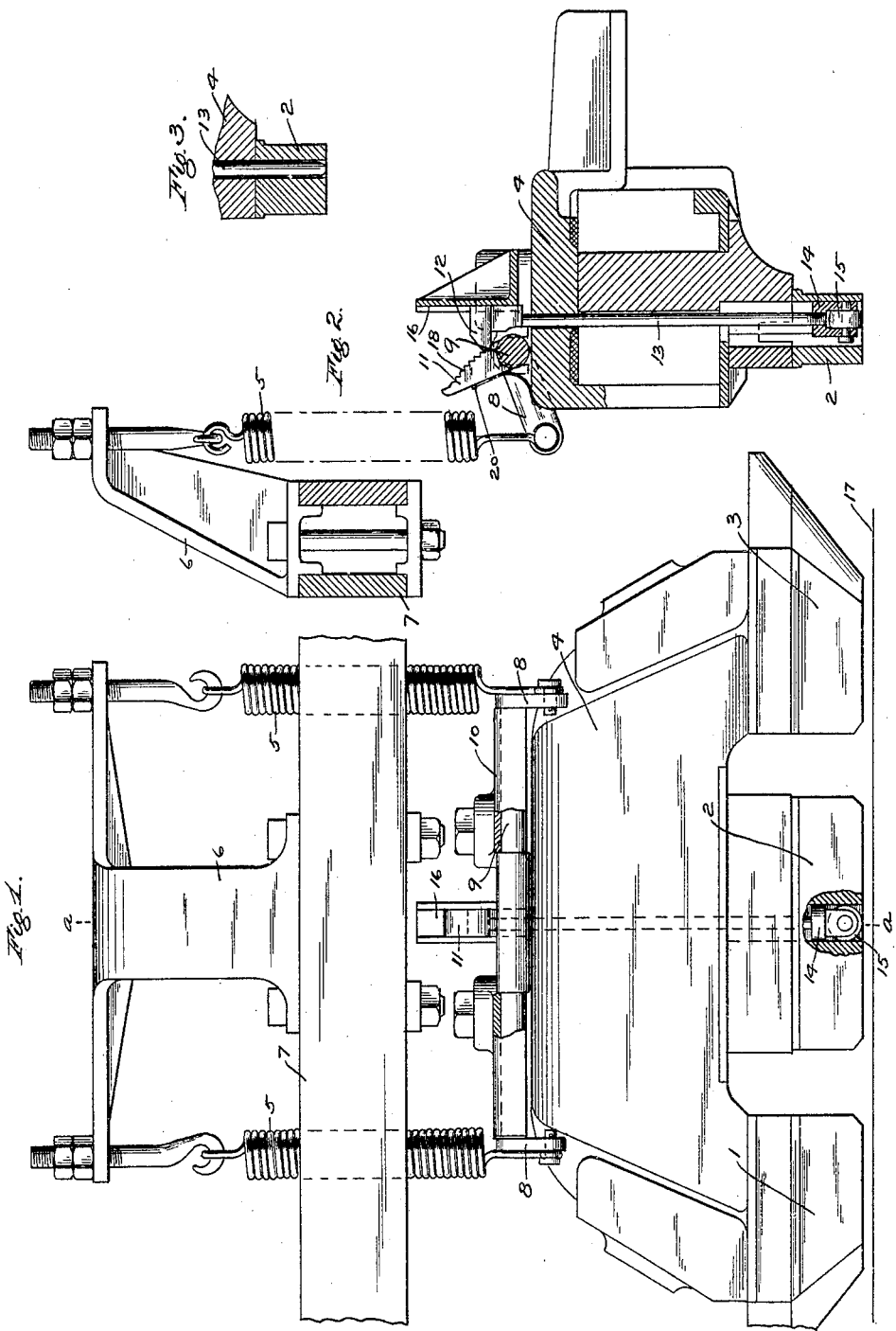

OSCAR S. McCURDY, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

BRAKE-SHOE ADJUSTER.

No. 931,212.  Specification of Letters Patent.  Patented Aug. 17, 1909.

Application filed December 12, 1907. Serial No. 406,172.

*To all whom it may concern:*

Be it known that I, OSCAR S. MCCURDY, a citizen of the United States, residing at Wilkinsburg, in the county of Allegheny and State of Pennsylvania, have invented new and useful Improvements in Brake-Shoe Adjusters, of which the following is a specification.

My invention relates to adjusting devices for railway brakes and has for its object to provide an improved construction adapted to automatically compensate for the wear of the brake shoe and maintain the gap substantially constant between the brake shoe and the wheel, rail or other engaging friction surface, while the shoe is in normal release position.

Though adapted for general use, my invention has special application in connection with magnetic brakes, wherein the shoe is magnetized by sending a current of electricity through its electric magnet coil, and is thereby attracted to the rail or other friction surface, the frictional resistance thus caused, being utilized to effect the braking action of the car. Brake shoes of the above character are usually suspended from springs, with the gap between shoe and rail as small as possible and still provide sufficient clearance space. If this gap or clearance space is increased, as would occur for instance, when the shoe wears away, the current required to bring the shoe into contact with the rail or friction surface is greater than needed to give the proper braking action, thus interfering with the gradual application of the braking force, and sometimes causing a sudden, undesired and heavy application of the brakes. In order to compensate for this wear of the brake shoe, I provide means adapted to be actuated by the shoe engaging friction surface according to the wear of the shoe, for automatically maintaining the gap or clearance space between the shoe and friction surface substantially constant in the normal release position thereof.

In the accompanying drawing, Figure 1 is a side view of a magnetic rail brake, with one form of my invention applied thereto; Fig. 2 a sectional view of the above, taken substantially on the line *a—a* of Fig. 1, and Fig. 3 a sectional view of a portion of a magnetic brake shoe, sufficient to illustrate a modified form of adjusting rod.

As shown in Fig. 1 of the drawings, the rail brake 4 may be provided with brake shoes 1, 2 and 3, and is suspended from springs 5, secured to a bracket 6 which is mounted on the truck frame 7. In the present construction, the supporting springs 5 are attached to the outer ends of levers 8, secured to a shaft 9, which is rotatably mounted in a bearing 10, preferably on the top portion of the rail brake 4. The angular position of the levers 8 determines the distance from the rail at which the rail brake is maintained, and for the purpose of adjusting this angular position of the levers 8 and maintaining the same in adjusted position, I preferably provide a ratchet lever 11, secured to the shaft 9 at approximately an angle of 90 degrees with the levers 8, and provided with notches 18. A pawl 12, adapted to engage the notches 18 and preferably slidably mounted in a guide bearing 16, is secured to the upper end of an adjusting rod 13 and normally locks the ratchet lever 11 and levers 8 in a fixed position. By this means the rail shoe is maintained in position above the rail, and in order to compensate for the wear of the shoe, the adjusting rod 13 extends through the rail brake and shoe, so as to be actuated by engagement with the rail. I may provide the lower end of the rod 13 with a yoke 14, in which is mounted a roller 15, adapted to roll on the rail when the brake is applied, in order to reduce the contact friction. As the brake shoe wears away, the rod 13 is moved upwardly when the shoe is applied to the rail, and as soon as the wear is sufficient to cause the adjusting rod to be elevated the amount of one notch, it will be apparent that when the brake is released, the pawl 12 will engage the next higher notch and thereby permit the levers 8 to move around a corresponding distance, thereby letting the rail brake down toward the rail. The distance between the friction surface and the brake shoe is thus maintained substantially constant in the release position of the parts and is governed by the wear of the brake shoe.

The roller 15 is preferably hardened to prevent excessive wear. If desired, the roller 15 may be dispensed with and the adjusting rod end may be arranged to contact the rail directly, as shown in Fig. 3. The contacting end of the rod may be hardened to prevent wear, as in the case of the roller construction.

In order to prevent possible accidental movement of the adjusting rod, such as might be occasioned by jarring or by hitting an obstruction, which would have a tendency to throw the pawl 12 out of adjustment, I may provide a spring 20 adapted to press against the ratchet lever 11 and firmly maintain the same in proper engagement with the pawl 12. The spring may be conveniently secured to the top of the rail brake casing 4. If desired a friction device may be applied to the adjusting rod 13 to yieldingly resist its movement, to answer the same purpose as the spring 20, as will be readily understood.

Having now described my invention, what I claim as new and desire to secure by Letters Patent is:—

1. In a railway brake, the combination with a brake shoe, of means operated by the movement of the shoe to and from the engaging surface, for regulating the distance between the shoe and said engaging surface.

2. In a railway brake, the combination with a magnetic brake shoe, of means operated by the movement of the shoe to and from the engaging surface, according to the wear, for maintaining the gap between said shoe and engaging surface substantially constant.

3. In a railway brake, the combination with a magnetic rail brake shoe, of means operated by the rail, according to the wear of said shoe, for maintaining the gap between shoe and rail substantially constant.

4. In a railway brake, the combination with a magnetic brake shoe, of means operated by the movement of the shoe to and from its engaging surface according to the wear of the brake shoe, for maintaining the gap between said shoe and engaging surface substantially constant in the normal release position of said shoe.

5. In a railway brake, the combination with a magnetic brake shoe and springs for supporting said shoe in proximity to the engaging friction surface therefor, of means operated by movement of the shoe vertically upon a predetermined wear of the brake shoe for adjusting the relative distance between the shoe and its engaging surface.

6. In a railway brake, the combination with a magnetic brake shoe and springs for supporting said shoe in proximity to the engaging friction surface therefor, of means operated by movement of the shoe in the direction to apply the brake upon a predetermined wear of the brake shoe for adjusting the relative distance between the shoe and the engaging surface in the normal release position of the parts.

7. In a railway brake, the combination with a brake shoe of a rod extending through said shoe and adapted to contact the engaging friction surface for said shoe, and means operated upon movement of the rod by the rail as the shoe wears away for maintaining the gap between the shoe and engaging surface substantially constant.

8. In a railway brake, the combination with a brake shoe, of a rod operated by the shoe engaging surface according to the wear of the shoe and means operated by said rod for maintaining the gap between shoe and engaging surface substantially constant.

9. In a railway brake, the combination with a brake shoe, of an adjusting rod operated by the shoe engaging surface according to the wear of the shoe for maintaining the gap between shoe and engaging surface substantially constant, and an anti-friction device mounted on said adjusting rod to contact with the shoe engaging surface when the brake is applied.

10. In a railway brake, the combination with a brake shoe, of means operated, according to the wear of said shoe on its engaging surface, by the movement to and from said engaging surface for maintaining the gap between shoe and engaging surface substantially constant.

11. In a railway brake, the combination with a brake shoe, of means operated, according to the wear of said shoe on its engaging surface, by contact with and movement to and from said shoe engaging surface for maintaining the gap between shoe and engaging surface substantially constant.

12. In a railway brake, the combination with a brake shoe, of means operated, according to the wear of said shoe on its engaging surface, by contact with and movement to and from said shoe engaging surface for maintaining the gap between shoe and engaging surface substantially constant in the normal release position of the parts.

13. The combination with a brake shoe, of self contained means for regulating the gap between the shoe and its engaging surface.

14. The combination with a brake shoe, of self contained means for adjusting the shoe according to the wear on its engaging surface.

In testimony whereof I have hereunto set my hand.

OSCAR S. McCURDY.

Witnesses:
R. F. EMERY,
WM. M. CADY.